United States Patent [19]

Coté

[11] Patent Number: 4,572,991

[45] Date of Patent: Feb. 25, 1986

[54] HIGHER EFFICIENCY INCANDESCENT LIGHTING UNIT HAVING AN IMPROVED BALLAST UNIT

[75] Inventor: Paul T. Coté, Cleveland Heights, Ohio

[73] Assignee: General Electric Company, Schenectady, N.Y.

[21] Appl. No.: 571,008

[22] Filed: Jan. 16, 1984

[51] Int. Cl.$^4$ .................... H05B 37/00; H05B 39/00; H05B 41/14
[52] U.S. Cl. ................. 315/240; 315/241 R; 315/245; 361/15; 361/58
[58] Field of Search ............... 315/240, 244, 241, 245; 361/15, 16, 58, 79, 88, 89, 272; 340/530

[56] References Cited

U.S. PATENT DOCUMENTS

| | | | |
|---|---|---|---|
| 3,274,484 | 9/1966 | Gebhardt et al. | 315/240 X |
| 3,406,324 | 10/1968 | Ayers | 361/15 X |
| 4,012,667 | 3/1977 | Ishida et al. | 361/15 |
| 4,447,764 | 5/1984 | Kornrumpf et al. | 315/240 |

Primary Examiner—Saxfield Chatmon
Attorney, Agent, or Firm—John P. MaMahon; Philip L. Schlamp; Fred Jacob

[57] ABSTRACT

An improved general service incandescent lamp having an improved capacitive ballast circuit for operating a low voltage filament of the lamp is disclosed. Various embodiments of an improved capacitive ballast circuit that substantially eliminates unwanted stored energy and unwanted resistive dissipation are disclosed.

10 Claims, 8 Drawing Figures

HIGHER EFFICIENCY INCANDESCENT LIGHTING UNIT HAVING AN IMPROVED BALLAST UNIT

BACKGROUND OF THE INVENTION

This invention relates to general service incandescent lighting units, and more particularly, to a higher efficiency general service incandescent lighting unit having an improved capacitive ballast circuit.

The continuing pursuit of improving the efficiency of lamps is of increasing importance due to the increasing cost of energy. One of the family of lamps in which efficiency is desired to be improved is the incandescent lamp. Incandescent lamps, although having efficiency ratings lower than those of fluorescent and high intensity discharge lamps, have many attractive features, such as, low cost, compact size, instant light, dimmability, convenience, pleasing spectral distribution, and millions of existing sockets in the homes of the users who have become accustomed to the pleasing incandescent type lighting.

The efficiencies of the incandescent lamp have recently been improved and such improvements are described in U.S. patent application Ser. No. 519,162 and U.S. Pat. Nos. 4,517,491; 4,535,269; and 4,524, 302 all filed Aug. 1, 1983 and assigned to the same assignee as the present invention.

The hereinabove referenced U.S. patent application Ser. No. 519,165 discloses a filament operated at a low voltage while maintaining the wattage and even increasing the efficacy of the general service incandescent lamp containing the filament.

The operation of a filament at a low voltage may be accomplished by the use of a capacitive ballast circuit. One such ballast circuit is described in my U.S. patent application Ser. No. 379,411, now U.S. Pat. No. 4,516,056 filed May 18, 1982 and assigned to the same assignee as the present invention. In such a ballast circuit a first and a second capacitive element reduce the voltage applied across a low voltage filament.

I have determined that in the use of capacitive elements to reduce the voltage across the filament, certain disadvantages can exist in the event the capacitive elements should be inadvertently left in their charged state. The disadvantages resulting from inadvertently charged capacitive elements are (1) if the plug of the lamp fixture, housing the lamp, is suddenly removed from the wall receptacle, the potential of the charged capacitive elements may be present at the prongs of the plug, and (2) if the lamp is quickly removed from the socket of the fixture, the potential of the charged capacitive elements may be present at the base of the lamp. Additionally, if the power applied to the lamp is suddenly interrupted and then quickly reapplied, the voltage potential across the capacitive elements may be of a value, such as 440 volts, which if allowed to discharge across the filament may damage the filament.

Various means such as a resistor placed in a parallel arrangement with the capacitive elements such as to bleed off the charge stored in the capacitive elements can be a solution to the disadvantage of the capacitive ballast circuits. However, in order for the bleed-off time to be less than, for example two seconds, a resistor in the order of 20K ohms is typically required. Such a resistor is disadvantageous in that it dissipates about 0.5 watts during a steady-state operation which degrades the efficacy of the improved general service lamp. It is desired to operate a capacitor ballast circuit having means to prevent inadvertently charged capacitive elements without the need of providing devices which degrade the efficacy of the improved general service incandescent lamp.

Accordingly, an object of the present invention is to provide an improved general service incandescent lamp having a capacitor ballast circuit for a low voltage filament and having means to reduce substantially or even to eliminate the efficacy degradation of the capacitive ballast circuits.

This and other objects of the present invention will become apparent upon consideration of the following description of the invention.

SUMMARY OF THE INVENTION

The present invention is directed to an improved general service incandescent lamp having an improved capacitor ballast circuit for operating a low voltage filament.

In one embodiment of the present invention a general service incandescent lighting unit comprises (a) a base having an electrically conductive screw-in section, (b) an outer envelope mounted on the base, (c) an inner envelope coaxially disposed within the outer envelope and containing a halogen gas atmosphere along with a high pressure fill-gas, (d) a low voltage filament coaxially disposed within the inner envelope, and (e) a capacitive ballast circuit having a capacitive element of a preselected value and serially connected with the filament. The ballast circuit further comprises a sensing means for sensing the active condition of the capacitive element and developing in response to the active condition a control signal which is applied to a switching means so as to be rendered conductive and provide a resistive discharge path to cause the capacitive element to be substantially discharged.

The particular features of the invention believed to be novel are set forth with particularity in the appended claims. The invention itself, however, both as to its organization and operation, together with further objects and advantages thereof may best be understood by reference to the following description taken in conjunction with the accompanying drawing.

DETAILED DESCRIPTION OF THE PREFERRED EMBODIMENT

Figure 1:
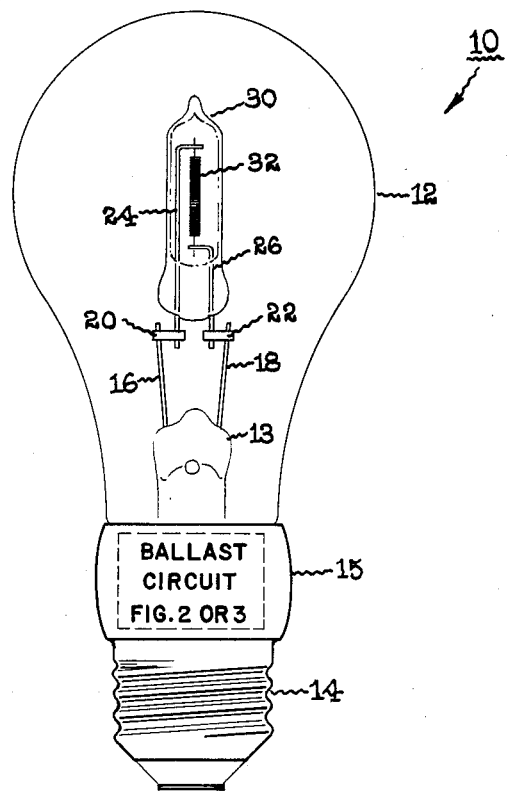
FIG. 1 shows a general service incandescent lighting unit constructed generally in accordance with the present invention.

A general service incandescent lighting unit 10 is shown in FIG. 1 as comprising a base 14 having an electrically conductive screw-in section. An outer envelope 12 is attached to the base 14. The lighting unit 10 further comprises an inner envelope 30 coaxially disposed and supported within the outer envelope 12 and which contains a halogen gas atmosphere along with a high pressure fill-gas. Coaxially disposed and supported within the inner envelope 30 is a low voltage tungsten filament 32 operated in the range of 24 to 36 volts.

The inner envelope 30 may be comprised of a glass or quartz material. The filament 32 is arranged within the inner envelope 30 across lead-in conductors 24 and 26. The filament 32 along with the inner envelope 30 may each be of the type described in the previously mentioned U.S. patent application having Ser. No. 519,165, assigned to the same assignee as the present invention and herein incorporated by reference. The lead-in conductors 24 and 26 are connected to inleads 16 and 18 via cross members 20 and 22, respectively. The filament 32 is operated by one of the ballast circuit arrangements of FIG. 2 or FIG. 3 each shown in FIG. 1 as located in the housing 15 of the lamp 10.

Figure 2:
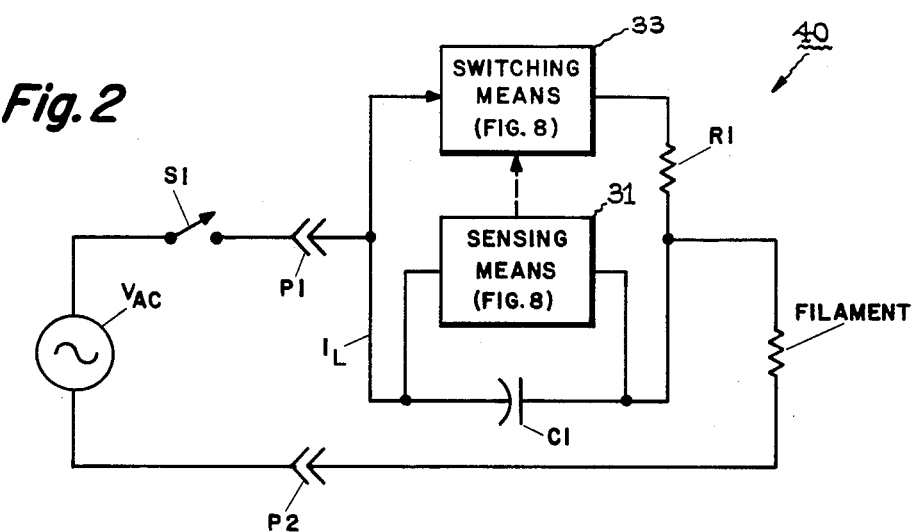
FIG. 2 shows a circuit arrangement of a capacitive ballast circuit in accordance with the present invention.

FIG. 2 is a block diagram representative of a capacitive ballast circuit 40 in accordance with one embodiment of the present invention. The circuit 40 has a capacitive element C1 arranged in a serial manner with the FILAMENT. The capacitive element C1 has connected across it a sensing means 31 for sensing the active condition of the capacitive element C1 and developing in response to the active condition a control signal which is applied to a switching means 33 so as to be rendered conductive and cause the capacitive element C1 to be discharged by a path provided by resistor R1.

Figure 3:
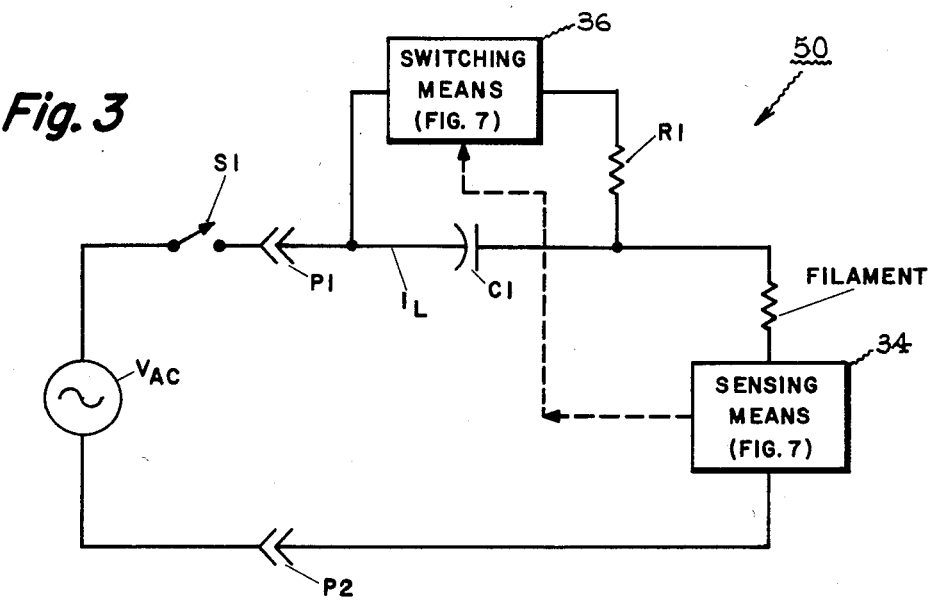
FIG. 3 shows an alternative embodiment of the capacitive ballast circuit of the present invention.

A second embodiment of a ballast circuit 50 is shown in FIG. 3 and operates in a manner similar to that of FIG. 2 except that its sensing means 34 is in a serial arrangement with the capacitive element C1 and FILAMENT.

Figure 4:
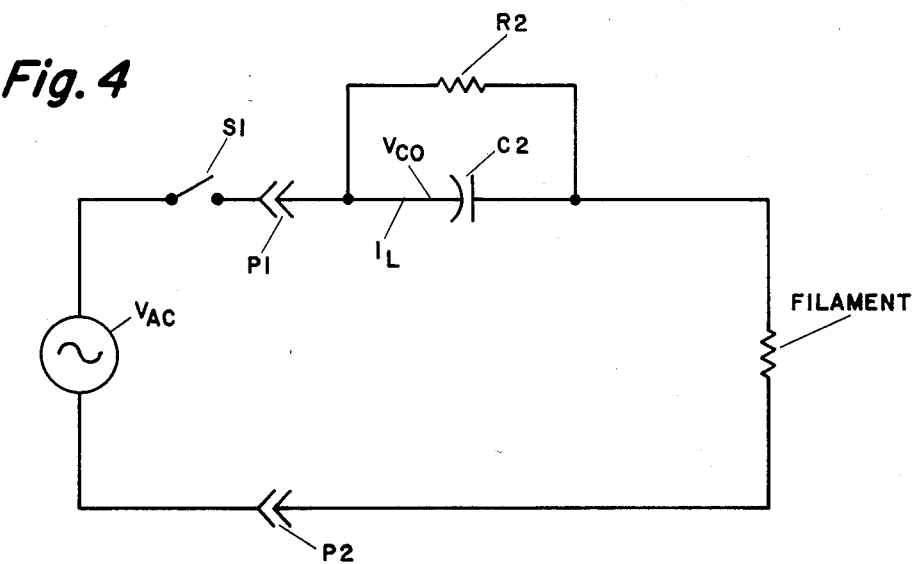
FIG. 4 shows a prior art circuit arrangement.

In order that both embodiments of the present invention may be more readily understood, reference is made to FIG. 4 showing an arrangement of a capacitor ballast circuit.

The circuit of FIG. 4 included means for having an alternating current (A.C.) voltage $V_{AC}$, having a typical value of 120 volts at a frequency 60 Hz, applied to its inputs. One side of the A.C. voltage $V_{AC}$ is connected to one side of the filament via an appropriate electrical contact, shown as P2 of the lamp, whereas, the other side of the A.C. voltage is connected to the other side of the FILAMENT via a serially arrangement of (1) a switch S1, (2) an appropriate contact P1, shown as P1 of the lamp, and (3) a parallel arrangement of a capacitive element C2 and a resistor R2. The capacitive element C2 provides a predetermined series reactance path to the applied A.C. voltage $V_{AC}$ so that the portion of the voltage $V_{AC}$ applied across the filament is reduced from 120 volts to a desired value in the range of 24 to 36 volts.

The resistor R2 connected across the capacitive element C2 is used to provide a path to discharge the unwanted energy that may be inadvertently stored in the capacitive element C2.

As discussed in the "Background" section, the inadvertently stored unwanted energy of the capacitive element C2 may be created if the lamp (not having resistor R2) is removed from its socket with the capacitive element in the charged state thereby presenting unwanted energy at P1 and P2 of the lamp. Similarly, if the plug coupling the A.C. voltage $V_{AC}$ to the lamp, is removed from its wall receptacle, unwanted energy is present at the prongs (not shown) of the plug.

The capacitive element C2 may be of a relatively large value, for example, 50 microfarads for a 60 watt-24 volt incandescent lamp. In order to provide a relatively fast discharge time, for example, two (2) seconds, for the unwanted stored energy of the 50 microfarad capacitive element C2, a resistor R2 of 20K may be used. This 20K ohm resistor R2 typically dissipates about 0.5 watts of wasted energy during steady state operation of the prior art circuit arrangement of FIG. 4, which unwanted dissipation degrades the efficacy of the lamp in which the resistor R2 is implemented.

A further related disadvantage of the prior art circuit arrangement of FIG. 4 related to damaging the filament may exist if the voltage applied to or removed from the filament is not accomplished in an orderly desired manner and may be described with reference to FIG. 5.

Figure 5:
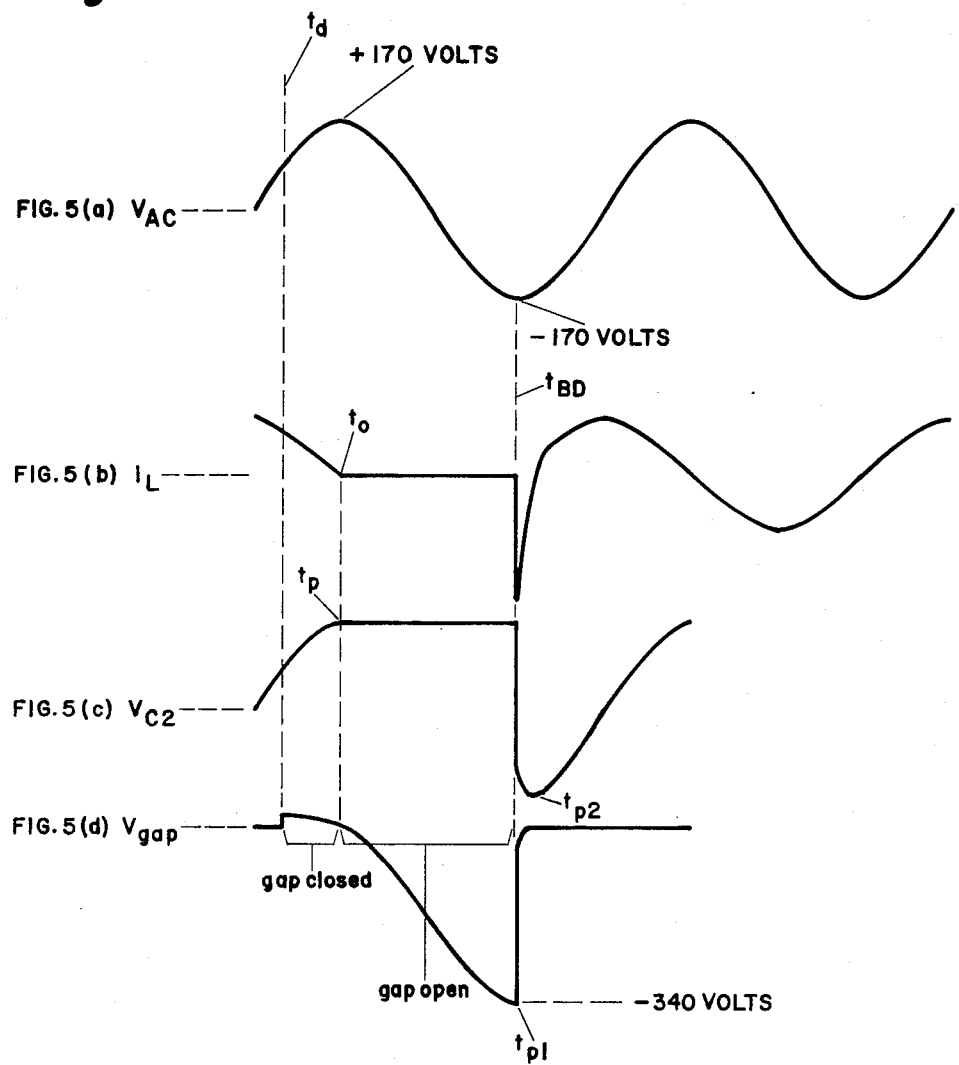
FIG. 5 shows the wave shapes related to the operation of the circuit arrangement of FIG. 4.

FIG. 5 is segmented into, (1) FIG. 5(a) showing the waveform of the applied A.C. voltage $V_{AC}$, (2) FIG. 5(b) showing the waveshape of the current $I_L$ flowing in the circuit arrangement of FIG. 4, (3) FIG. 5(c) showing the voltage $V_{C2}$ across the capacitive element C2, and (4) FIG. 5(d) showing the arc voltage $V_{gap}$ that may appear at P1, P2 or S1 of FIG. 4. A comparison between FIGS. 5(a), 5(b) and 5(c) reveal that the steady state current $I_L$ (FIG. 5(b)) leads the voltage $V_{AC}$ (FIG. 5(a)) by nearly 90° and the voltage $V_{AC}$ is nearly in phase with the voltage $V_{C2}$ (FIG. 5(c)). The voltages $V_{AC}$ and $V_{C2}$ are essentially in-phase quantities because for the value previously given for the capacitor C2 of 50 microfarads and for a typical filament resistance of 9.6 ohms, the impedance $X_{C2}$ significantly exceeds that of the resistance of the filament.

For this condition, if either switch S1, contact P1 or contact P2 begins to open for example, at time $t_d$ of FIG. 5(a), an arc between the contacts of switch S1 or between contacts P1 or P2 and their mating contacts in the socket of the lamp fixture will most likely occur. The conductive or arcing condition of the switch S1, contact P1 or P2 is shown in FIG. 5(d) as the duration "gap closed," whereas, the non-conductive or non-arcing condition of switch S, contact P1 or P2 is shown in FIG. (d) as the duration "gap open." The transition from the durations gap closed to gap open is shown by the initiation of the negative going waveshape of $V_{gap}$ of FIG. 5(d). The arc voltage $V_{gap}$ maintains current flow $I_L$ within the lamp until the zero-crossing condition of $I_L$ (shown as $t_o$ in FIG. 5(b)), at which time the arc will extinguish. For this condition the capacitive element C2 is charged to a peak voltage $V_{C2}$ of approximately 170 volts for a typical $V_{AC}$ of 120 volts.

The peak voltage of $V_{C2}$ is shown in FIG. 5(c) by event $t_p$ and corresponds to the +170 voltage value of $V_{AC}$ of FIG. 5(a). The voltage $V_{C2}$ of FIG. 5(c) remains at this peak condition because $I_L$ of FIG. 5(b) is zero, the arc having extinguished. As the line voltage $V_{AC}$ begins to swing to its negative polarity, a voltage of up to twice the peak voltage e.g. 340 volts (shown in FIG. 5(d) by event $t_{p1}$), may appear across the device S1, P1 or P2 that was initially opened (event $t_d$ of FIG. 5(a)). If the device S1, P1 or P2 has not opened (shown by the duration, gap open of FIG. 5(d)) sufficiently in one-half cycle of the $V_{AC}$ voltage, e.g. approximately 8 milliseconds, since the arc extinction (event $t_o$ of FIG. 5(b)), the arc will restrike at some time later (shown as event $t_{BD}$ related to FIGS. 5(a), (b), (c) and (d)) and allow capacitive element C2 (event $t_{p2}$ of $V_{C2}$ of FIG. 5(c)) to discharge into the filament. The stored energy of the capacitive element C2 may be expressed by the relationship given in Joules:

$$W = \tfrac{1}{2}CV^2 \quad (1)$$

where C has a value of 50 microfarads and V has a value of 340 volts so that expression (1) yields the following results:

$$W = \tfrac{1}{2}(50 \times 10^{-6})(340)^2 \quad (2)$$
$$= 2.89 \text{ Joules}$$

A discharge of 2.89 Joules is an excessive amount of energy to be delivered to the low voltage filament and can cause damage to the filament especially if delivered repeatedly. The disadvantage of the prior art circuit arrangement of FIG. 4 having waveshapes of FIG. 5 are substantially reduced or even eliminated by the present invention.

In general, the circuit arrangements of FIGS. 2 and 3 which have switching means 33 and 36, respectively, connected across the capacitive element C1, cause the capacitive element C1 to be discharged in a relatively quick manner, via the bleed-off resistor R1 having a relatively small value such as 60 ohms, if the voltage of the capacitor C2 does not change for a predetermined duration such as 1.0 milliseconds. It should be noted that the 1.0 millisecond duration is determined even in the absence of the applied $V_{AC}$ voltage by virtue of the stored energy typically available in the power supply energizing the sensing means 34 of FIG. 7 and 31 of FIG. 8.

The discharging of the capacitive element C1, in response to this unchanged 1.0 millisecond duration voltage, quickly eliminates the unwanted energy present at the prongs of a plug removed from a wall receptacle or at the base of the lamp removed from its fixture. Further, the quick discharge of the capacitive element C1, via resistor R1, reduces or substantially eliminates the possible damage to the filament by preventing the relatively high stored energy, e.g., 2.89 Joules, from being discharged into the filament. The circuit arrangements of FIGS. 2 and 3 provide the improvement without the need of a continuous power dissipation resistor which would otherwise reduce the efficacy of the lamp unit. The operation of the circuit arrangements 40 and 50 of FIGS. 2 and 3 may be described with reference to FIG. 6.

Figure 6:
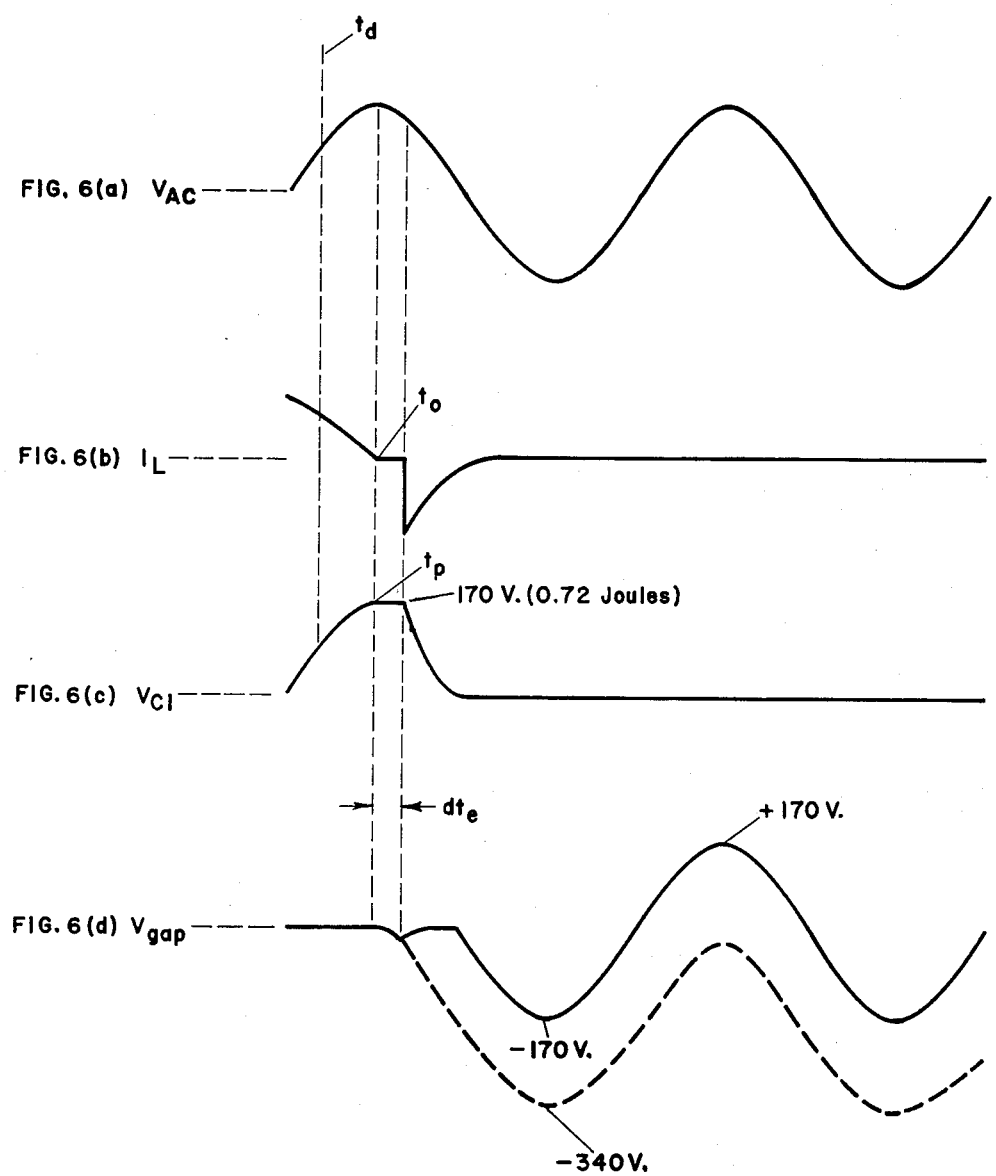
FIG. 6 shows the waveforms related to the operation of the circuit of FIGS. 7 and 8.

FIG. 6 is similar to FIG. 5 and is segmented into, (1) FIG. 6(a) showing the AC line voltage $V_{AC}$, (2) FIG. 6(b) showing the current ($I_L$) flowing in the lamp, (3) FIG. 6(c) showing the voltage $V_{C1}$ across the capacitor C1, and (4) FIG. 6(d) showing the arc voltage $V_{gap}$ that may appear across P1, P2 or S1 of FIGS. 2 and 3. FIG. 6 shows events $t_d$ (FIG. 6(a)), $t_o$ (FIGS. 6(b)), and $t_p$ (FIG. 6(c)), all previously described with regard to FIG. 5.

FIG. 6(c) further shows a duration $dt_e$, having an initial quantity of $t_p$, and is meant to represent an elapsed time which is indicative that the charged state of the capacitive element C1 remains unchanged for the previously discussed predetermined duration of approximately 1.0 millisecond. If this duration $dt_e$ expires, the discharge of the capacitive element C2 is initiated, and $V_{C1}$ decays from its peak value at $t_p$ of about 170 volts toward its zero condition. The stored energy of $V_{C1}$ for this 170 volt condition may be determined by expressions (1) and (2) and has a value of about 0.72 Joules which is substantially less than the 2.89 Joules discharge previously discussed with regard to FIG. 5.

The time duration in which $V_{C1}$ is discharged, shown in FIG. 6(c) as occurring in less than one-half cycle (4.0 milliseconds), is determined by the values selected for the capacitive element C1 and the bleed-off resistor R1. For the circuit arrangement of FIGS. 2 and 3, C1 has a value of 50 microfarads and R1 has a value of 60 so that C1 is substantially discharged in about 4.0 milliseconds.

The circuit arrangements of FIGS. 2 and 3, having the bleed-off resistor R1, substantially reduces the likelihood of the gap to break over and conduct which may be described with reference to FIG. 6(d).

FIG. 6(d) shows $V_{gap}$ as having a dashed line and solid line waveshapes. The dashed line waveshape indicates the voltage waveshape which could appear between the gap, previously discussed as contacts of switch S1 or between contact P1 or P1 and their mating contact in the socket, if capacitor C1 is not discharged. If C1 remains charged to 170 volts, then as much as 340 V could appear across the gap making breakdown, that is, an arc condition, a probable occurrence.

The present invention reduces this probability as shown by the solid line waveshape of FIG. 6(d). The solid waveform shows the $V_{gap}$ which exists by causing the previously described discharge of capacitor C1. The $V_{gap}$ for the present invention is simply that of $V_{AC}$ (FIG. 6(a)) varying between peaks of about $-170$ volts to $+170$ volts. For this peak voltage the break-over condition of the gap is substantially reduced and possibly eliminated.

The bleed-off resistor R1 is interconnected to the capacitive element C1, so as to provide a discharge path, in circuit arrangements 40 and 50 by switching means 33 and 36, respectively. The current conducted through the switching means 33 and 36 is typically 3.0 amps for a duration of less than 4.0 milliseconds. The switching means 33 along with its related sensing means 31 for sensing the unchanged charged state of the capacitive element C1 are shown in detail in FIG. 8, whereas, the switching means 36 along with the related sensing means 34 for sensing the unchanged charged state of the capacitive element C1 are shown in detail in FIG. 7.

Figure 7:
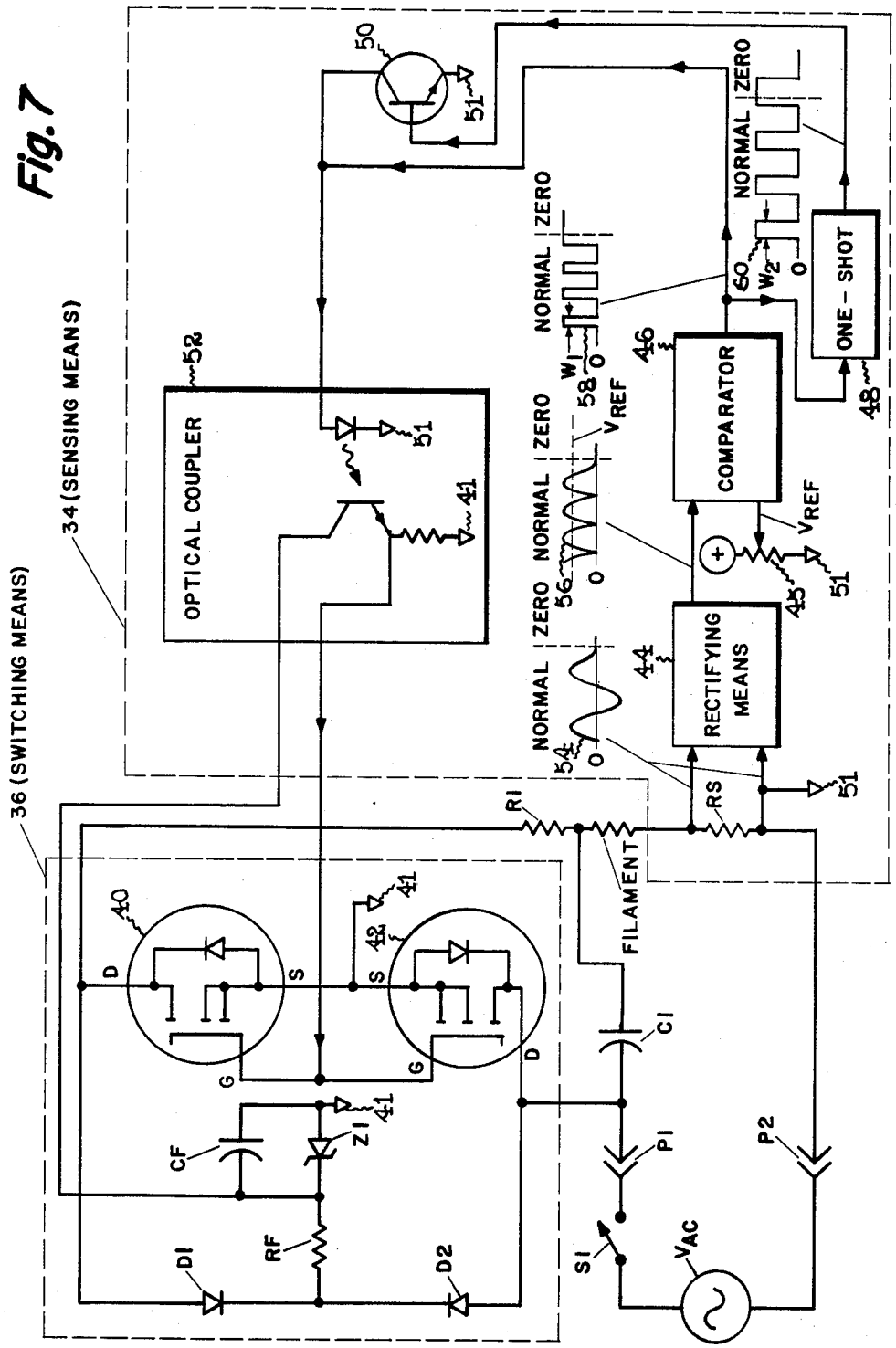
FIG. 7 shows the details of the circuit arrangement related to FIG. 3.

FIG. 7 shows the switching means 36 as comprised of two metal-oxide semiconductor field-effect transistors (MOS/FET) 40 and 42 having inherent parasitic diodes and available from International Rectifier Co. of El Segundo, CA. The field effect transistors provide a high impedance between the capacitor C1 and the resistive discharge path of R1. The switching means 36 further comprises diodes D1 and D2, a zener diode $Z_1$, a resistor RF having a typical value of 47K ohms, and a capacitor CF having a typical value of 10 microfarads. The sensing means 34 is of a current sensing type and may be comprised of a plurality of elements having the reference number, circuit function and of the type all given in Table 1.

TABLE

| Element Reference Number | Circuit | Type |
|---|---|---|
| RS | Sensing Resistor | 1 ohm |
| 44 | Rectifying Means | Plurality of four (4) diodes arrangement in a full-wave configuration or a conventional dif- |

TABLE-continued

| Element Reference Number | Circuit | Type |
|---|---|---|
| | | ferential amplifier rectifier circuit configuration |
| 46 | Comparator | A differential amplifier of the type (CA3130) available from RCA of Somerville, NJ. |
| 48 | One-Shot | An astable multi-vibrator of the type ICM7555 available from Intersil of Cupertino, CA. |
| 50 | Transistor | Semiconductor device of the type 2N5223 available from GE of Syracuse, NY. |
| 52 | Optical Coupler | Light-emitting device of the type H11G2 available from GE of Syracuse, NY. |

The devices 40 and 42 each have a source (S), drain (D) and gate (G) electrode. The source (S) and drain (D) electrodes of each device 40 and 42 are shunted by an inherent parasitic diode as shown in FIG. 7. The diodes D1 and D2 together with the inherent diodes of devices 40 and 42 form a full-wave rectifier, as shown in FIG. 7, for operating the optical coupler 52. The source (S) electrodes of devices 40 and 42 are interconnected and connected to a common ground point 41 which is floating with respect to either side of the $V_{AC}$ voltage having the potential present at P1 and P2 of lamp unit 10. The drain (D) electrode of device 40 is connected to one end of resistor R1 and to the anode of diode D1, whereas, the drain (D) electrode of device 42 is connected to one end of capacitive element C1 and to the anode of diode D2 all as shown in FIG. 7. The gate (G) electrodes are commoned together and connected to the output of the optical coupler 52 of sensing means 34. One side of capacitor CF and the anode of zener diode Z1 are connected to the common ground point 41. The cathode of the zener diode Z1 is connected (1) to the other end of capacitor CF; (2) to the collector of the transistor of the optical coupler 52; and (3) to one end of resistor RF having its other end connected to each of the cathodes of diodes D1 and D2. The zener diode Z1, capacitor CF and resistor RF form a filter and voltage regulator network.

Sensing means 34 has the sensing resistor RS serially arranged with the filament of the lamp unit 10 and provides the input signal 54 to the rectifying means 44. Rectifying means 44 rectifies the input signal 54 and develops signal 56 which is routed to an input of comparator 46. The rectified signal 56 along with signal 54 are indicative of the voltage condition of the capacitor C1.

In general, the comparator 46 compares the rectified signal 56 against a predetermined reference voltage ($V_{REF}$) established by a selectable potentiometer 45. In response to the comparison, the comparator 46 generates a first pulse train signal 58 responding to a condition indicative that the voltage level of rectifier signal 56 is greater than the predetermined reference voltage ($V_{REF}$) and terminates the first pulse train signal 58 at a predetermined voltage level in response to a condition that the voltage level of rectified signal 56 is less than the predetermined reference voltage ($V_{REF}$).

The comparator 46 in response to the input signal 56 and the predetermined reference ($V_{REF}$) develops an output signal 58 which is routed to (1) the collector of transistor 50, (2) the input of the optical coupler 52 functionally shown as comprising a light-emitting diode and a light sensitive transistor, and (3) to the input of the one-shot device 48, which, in turn, develops an output signal 60 which is applied to the gate of transistor 50 which has its emitter connected to a common 51, which, in turn, is connected to P2 of the lamp unit 10.

In general, the transistor 50 and the optical coupler 52 comprise a detection means responsive to the first pulse train signal 58 and to a second pulse train signal 60, and generate the control signal to switching means 36 in response to the termination of the first pulse train signal 58.

The operation of the sensing means 34 is illustrated by the waveshapes of signals 54, 56, 58 and 60 of FIG. 7. The waveshapes of signals 54, 56, 58 and 60 are each shown as having a NORMAL and a ZERO portion. The NORMAL portion corresponds to the condition in which the voltage across the capacitor C1 is experiencing a periodic normally occurring change. The ZERO portion corresponds to the condition in which the voltage across the capacitor C1 is not experiencing a periodic change and thus the energy stored across the capacitor C1 is to be discharged via the bleed-off resistor R1.

The NORMAL conditions of signals 54, 56, 58 and 60, are respectively shown as (1) a periodic sinusoidal waveshape, (2) an A.C. rectified signal having a mid-portion corresponding to a reference voltage $V_{REF}$ which may be established by a selectable potentiometer 45 at the input to comparator 46, (3) a periodically occurring wavetrain comprised of pulses W1 having a typical pulse width of about 0.5 milliseconds, and (4) the periodically occurring second wavetrain signal comprised of pulses W2 chosen to be wider than W1, and having a typical pulse width of about 1.0 milliseconds. Normally, pulses W2 render transistor 50 conductive which prevents the actuation of optical coupler 52 by shorter pulses W1.

The ZERO conditions of signals 54, 56, 58 and 60 are respectively shown as (1) a waveshape having an amplitude of approximately zero (0), (2) a waveshape having an amplitude approaching zero (0), (3) a positive D.C. level, and (4) a zero D.C. level.

In operation, the rectified signal 56 is continuously compared by the comparator 46 against the reference voltage $V_{REF}$. When the value of the signal 56 becomes less and remains less than $V_{REF}$, which is representative of a zero condition being sensed by sensing resistor RS, the comparator 46 develops the ZERO condition of its output signal 58 that is, a positive dc level. The one-shot 48 in response to the ZERO condition of signal 58 develops its ZERO condition of its output signal 60, that is, a zero D.C. level following the 1.0 millisecond pulse. The ZERO condition of signal 60 renders transistor 50 nonconductive while signal 58 is positive thus actuating optical coupler 52, which, in turn, causes a signal to be applied to the gate (G) electrodes of devices 40 and 42 so as to render both devices 40 and 42 conductive. The conductive devices 40 and 42 corresponding to zero condition sensed by the sensing resistor RS, in turn, connect one side of capacitor C1 to the bleed-off resistor R1 so that the energy stored in capacitor C2 is essentially discharged.

Figure 8:
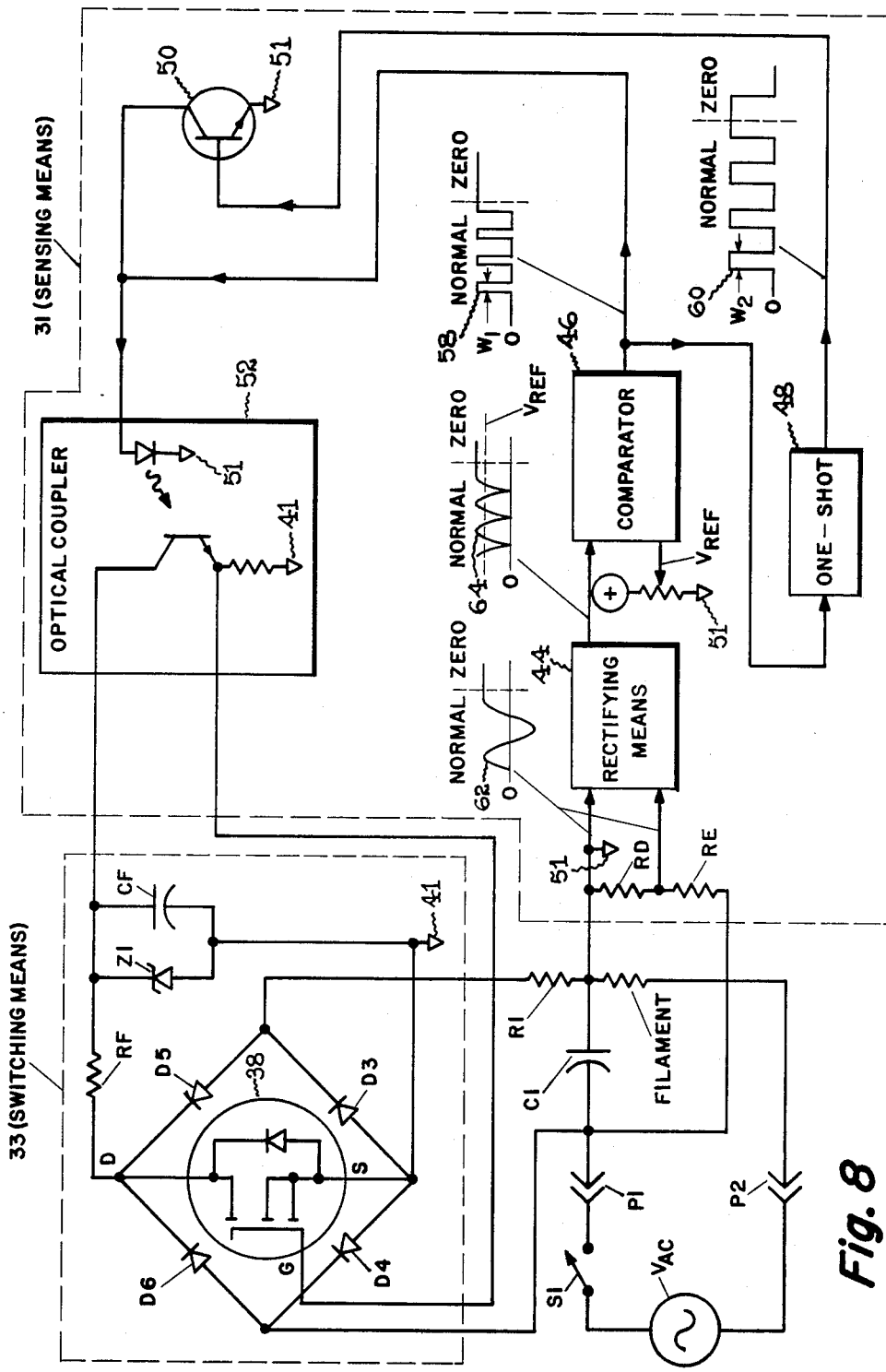
FIG. 8 shows the details of the circuit arrangement related to FIG. 2.

An alternate embodiment to supply the discharge path for the stored energy of the capacitive element C1 is shown in FIG. 8. The circuit arrangement of FIG. 8 is particularly advantageous in that it does not require a sensing resistor RS, arranged in series with the FILAMENT, to detect lamp current. The circuit of FIG. 8 is mainly comprised of switching means 33 and sensing means 31.

The switching means 33 may be comprised of (1) a metal-oxide-semiconductor field-effect transistor (MOS/FET) 38 which may be of the type previously given for devices 40 and 42 and (2) a plurality of diodes D3, D4, D5 and D6 arranged as shown in FIG. 8 in a full-wave rectifier configuration. The input node of the full-wave rectifier formed from diodes D4 and D6 is connected to one end of capacitor C1, whereas, the output node of the full-wave rectifier formed from diodes D3 and D5 is connected to one end of the resistive discharge path provided by resistor R1. The central nodes of diodes D3, D4, D5 and D6 have connected thereacross the device 38 and the node of diodes D3 and D4 is connected to the common 41. The gate (G) electrode of device 38 is connected to the output of optical coupler 52 which provides the control signal of sensing means 31.

The node formed by the cathodes of diodes D5 and D6 is connected via one end of the resistor RF as previously discussed with regard to FIG. 7. The other end of resistor RF is connected to; (1) the node formed by the cathode of zener diode Z1 and one end of capacitor CF; and (2) to the collector of the transistor of the optical coupler 52. The other end of capacitor CF and the anode of zener diode Z1 is connected to the common 41.

The sensing means 31 may utilize the optical coupler 52, the transistor 50, the rectifying means 44, the comparator 46, and the one-shot 48 all previously described with reference to FIG. 7. The sensing means 31 of FIG. 8 is of a voltage detecting type which is different than the current detecting sensing means 34 of FIG. 7. Further, unlike sensing means 34, sensing means 31 has a voltage divider network formed by RD and RE having respective typical values of 2.2K ohms and 100K ohms connected across capacitor C1 so that only a portion of the voltage $V_{C1}$ appears at the input to the rectifier means 44. The node formed by resistors RD and RE is connected to the input of rectifier means 44. Still further, unlike sensing means 34, the common potential 51 of sensing means 31 is connected to the node formed between resistor RD and capacitor C1. The sensing means 31 has signals 58 and 60 each having waveshapes including a NORMAL and a ZERO portion all of which are as described for FIG. 7. The sensing means 31 has signals 62 and 64 not previously discussed with regard to FIG. 7.

The signals 62 and 64 each have a NORMAL portion respectively represented as (1) a sinusoidal occurring waveshape, and (2) a rectified A.C. signal. The NORMAL portion of signal 64 has a peak value greater than the reference voltage $V_{REF}$ previously described with regard to FIG. 7.

In general, the comparator 46 compares the rectified signal 64 against the predetermined reference voltage ($V_{REF}$). In response to the comparison, the comparator 46 generates the first pulse train signal 58 responding to a condition indicative that the peak value of the rectified signal 64 is greater than the predetermined reference voltage ($V_{REF}$) and terminates the first pulse train signal 58 at a predetermined voltage level in response to a condition that the voltage level of the rectified signal 64 remains greater than the predetermined reference voltage ($V_{REF}$) for a typical predetermined duration of 1.0 milliseconds.

The signals 62 and 64 like signals 54 and 56 of FIG. 7 have a ZERO portion respectively represented by, (1) a waveshape having a positive steady-state value essentially corresponding to the peak value of signal 62, and (2) a positive steady-state value essentially corresponding to the peak value of signal 64 and exceeding the reference voltage $V_{REF}$. The ZERO conditions of signals 62 and 64 are representative that the voltage across capacitor C1 is remaining at peak value, that is, is not periodically changing and thus capacitor C1 needs to be discharged.

The comparator 46 in response to the ZERO portion of signal 64 develops its ZERO portion of waveshape 58 in a manner similar to that described for FIG. 7. Similarly, one-shot 48 in response to the ZERO portion of signal 58 develops its ZERO portion of waveshape 60 in a manner similar to that described for FIG. 7. Further, the transistor 50 in response to the ZERO portion of both signals 58 and 60 applies a signal via the optical coupler 52 to the gate (G) electrode of device 38 so as to render device 38 conductive. The conductive device 38 causes one end of capacitor C1 to be coupled to the bleed-off resistor R1 so that the unwanted stored energy of capacitor C1 is substantially discharged.

It should now be appreciated that the present invention provides an improved general service incandescent lamp employing a low voltage filament and having various embodiments of capacitive ballast circuits. The various embodiments of the ballast circuit each have means for quickly discharging unwanted energy that may be stored across capacitive elements. The various embodiments of the present invention provide such quick discharge without the need of continuously dissipative resistive elements that might otherwise degrade the efficacy of the improved general service incandescent lamp.

What I claim as new and desire to secure by Letters Patent of the United States is:

1. In an improved general service incandescent lighting unit having an electrically conductive screw-in base, an outer envelope mounted on said base, an inner envelope coaxially disposed within said outer envelope and containing a halogen gas atmosphere along with a high pressure fill-gas, and a low voltage filament coaxially disposed within said inner envelope, wherein the improvement comprises;

a capacitive ballast circuit comprising a capacitive element of a preselected value and serially connected with the filament, sensing means for sensing the active condition of said capacitive element and developing a control signal on a signal path in response to the condition where the voltage across the capacitive element does not change for a predetermined duration, and switching means rendered conductive in response to said control signal thereby effective to provide a resistive discharge path to cause the capacitive element to be substantially discharged.

2. An improved general service incandescent lighting unit according to claim 1 wherein said switching means comprises:

a first and a second field effect transistor each having source, drain and gate electrodes, said source electrodes being connected together and to a ground common, said gate electrodes being connected together to said signal path of said control signal of said switching means, the drain electrode of one of said field effect transistors being connected to one side of said capacitor and the drain electrode of the other field effect transistor being connected to one side of said resistive discharge path.

3. An improved general service incandescent lighting unit according to claim 1 wherein said switching means comprises;
 a field effect transistor and four diodes arranged in a full-wave rectifier configuration;
 said field effect transistor having a source and a drain electrode connected across central nodes of said full-wave rectifier with the source electrode being connected to a ground common, said field effect transistor having the gate electrode thereof connected to said signal path of said control signal of said switching means; and
 said full-wave rectifier having its input node connected to one side of said capacitor and its output node connected to the other side of said resistive discharge path.

4. An improved general service incandescent lighting unit according to claim 1 wherein said sensing means is connected in series with said filament.

5. An improved general service incandescent lighting unit according to claim 1 wherein said sensing means comprises:
 a sensing resistor RS connected in series with said filament;
 rectifying means connected across said sensing resistor for developing a rectified signal indicative of the voltage condition of said capacitor;
 means for comparing said rectified signal against a predetermined reference for generating a first pulse train signal onto a signal path in response to a condition indicative that the voltage level of said rectifier signal is greater than said predetermined reference, and terminating said first pulse train signal at a predetermined voltage level in response to a condition indicative that the voltage level of said rectified signal is less than said predetermined reference;
 means responsive to said first pulse train signal for generating a second pulse train signal onto a signal path having a pulse width greater than that of said first pulse train signal; and
 detection means responsive to said first and second pulse train signal for generating said control signal to said switching means in response to the termination of said first pulse train signal.

6. An improved general service incandescent lighting unit according to claim 5 wherein said detection means comprises a transistor and an optical coupler;
 said transistor has its base electrode coupled to said second pulse train, its emitter electrode coupled to a ground common, and its collector electrode connected to said signal path of said first pulse train and to an input stage of said optical coupler;
 said optical coupler is effective for generating said control signal in response to said termination of said first pulse train signal.

7. An improved general service incandescent lighting unit according to claim 1 wherein said sensing means is connected across said capacitor.

8. An improved general service incandescent lamp according to claim 1 wherein said sensing means comprises:
 a voltage divider network comprised of resistors RD and RE connected in parallel across said capacitor;
 rectifying means connected across node of said resistors RD and RE for developing a rectified signal indicative of the voltage condition of said capacitor;
 means for comparing said rectified signal against a predetermined reference for generating a first pulse train signal onto a signal path in response to a condition indicative that the voltage level of said rectified signal is greater than said predetermined reference, and terminating said first pulse train signal at a predetermined voltage level in response to a condition indicative that the voltage level of said rectified signal remains greater than said predetermined reference for a predetermined duration;
 means responsive to said first pulse train signal for generating a second pulse train signal having a pulse width greater than that of said first pulse train signal; and
 detection means responsive to said first and second pulse train signals in generating said control signal to said switching means in response to the termination of said first pulse train signal.

9. An improved general service incandescent lamp according to claim 8 wherein said detection means comprises a transistor and an optical coupler;
 said transistor has its base electrode coupled to said second pulse train, its emitter electrode coupled to a ground common, and its collector electrode connected to said signal path of said first pulse train signal and to an input stage of said optical coupler; and
 said optical coupler is effective for generating said control signal in response to said termination of said first pulse train signal.

10. An improved general service incandescent lighting unit according to claim 1 wherein said predetermined duration of said condition of said capacitive element is about 1.0 milliseconds.

* * * * *